US011499509B2

(12) United States Patent
Nishida et al.

(10) Patent No.: US 11,499,509 B2
(45) Date of Patent: Nov. 15, 2022

(54) ENGINE EXHAUST GAS RECIRCULATION SYSTEM

(71) Applicant: Mazda Motor Corporation, Hiroshima (JP)

(72) Inventors: Tomonori Nishida, Aki-gun (JP); Yuji Kojima, Aki-gun (JP); Noriaki Fujita, Aki-gun (JP); Ken Yoshida, Aki-gun (JP); Takashi Kariya, Aki-gun (JP); Takayuki Tominaga, Aki-gun (JP); Naoya Matsumoto, Aki-gun (JP); Yusaku Matsumura, Aki-gun (JP); Yuki Koda, Aki-gun (JP); Takuya Nishihara, Aki-gun (JP); Hiroyuki Ohmura, Aki-gun (JP); Arashi Imura, Aki-gun (JP); Fusatoshi Tanaka, Aki-gun (JP); Takuya Yamada, Aki-gun (JP); Shintaro Umesaki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/451,600

(22) Filed: Oct. 20, 2021

(65) Prior Publication Data

US 2022/0128019 A1 Apr. 28, 2022

(30) Foreign Application Priority Data

Oct. 28, 2020 (JP) .............................. JP2020-180182

(51) Int. Cl.
*F02M 26/14* (2016.01)
*F02M 26/01* (2016.01)
(Continued)

(52) U.S. Cl.
CPC ............. *F02M 26/14* (2016.02); *F01N 13/10* (2013.01); *F01N 13/14* (2013.01);
(Continued)

(58) Field of Classification Search
CPC ........ F02M 26/14; F02M 26/01; F02M 26/15; F02M 26/18; F02M 26/22; F02M 26/23;
(Continued)

(56) References Cited

U.S. PATENT DOCUMENTS

2013/0206120 A1* 8/2013 Yoshida ................. F02M 26/13
  123/568.12
2014/0318511 A1* 10/2014 Sekiya .................... F01N 13/08
  123/568.11

FOREIGN PATENT DOCUMENTS

DE 102014211677 A1 12/2014
EP 3889417 A1 10/2021
(Continued)

OTHER PUBLICATIONS

European Patent Office, Extended European Search Report Issued in Application No. 21204164.4, dated Mar. 14, 2022, Germany, 10 pages.

*Primary Examiner* — Audrey B. Walter
(74) *Attorney, Agent, or Firm* — Alleman Hall Creasman & Tuttle LLP (57) ABSTRACT

An exhaust gas recirculation system for a multi-cylinder engine is provided, which includes an exhaust manifold connected to a cylinder head, a catalyst connected to a downstream end of the exhaust manifold in terms of an exhaust gas flow, an EGR gas outlet provided downstream of the catalyst, an in-head EGR passage penetrating the cylinder head, and an EGR pipe extending from the EGR gas outlet and directly connected to an inlet of the in-head EGR passage to lead EGR gas thereto. The catalyst is disposed so that the exhaust gas flows therein from a first side to a second
(Continued)

side in an engine cylinder lined-up direction. The EGR gas outlet is located on the second side with respect to the center of the engine in the cylinder lined-up direction, and the inlet of the in-head EGR passage is located in the first side with respect to the engine center.

16 Claims, 7 Drawing Sheets

(51) Int. Cl.
| | |
|---|---|
| *F02M 26/22* | (2016.01) |
| *F01N 13/10* | (2010.01) |
| *F01N 13/14* | (2010.01) |
| *F01N 13/18* | (2010.01) |
| *F02B 75/02* | (2006.01) |
| *F02B 75/20* | (2006.01) |
| *F02M 26/15* | (2016.01) |
| *F02M 26/41* | (2016.01) |
| *F02M 26/23* | (2016.01) |
| *F02M 26/18* | (2016.01) |
| *F02B 75/18* | (2006.01) |

(52) U.S. Cl.
CPC .......... *F01N 13/1805* (2013.01); *F02B 75/02* (2013.01); *F02B 75/20* (2013.01); *F02M 26/01* (2016.02); *F02M 26/15* (2016.02); *F02M 26/18* (2016.02); *F02M 26/22* (2016.02); *F02M 26/23* (2016.02); *F02M 26/41* (2016.02); *F02B 2075/027* (2013.01); *F02B 2075/1816* (2013.01)

(58) Field of Classification Search
CPC ......... F02M 26/41; F01N 13/10; F01N 13/14; F01N 13/1805; F02B 75/02; F02B 75/20; F02B 2075/027; F02B 2075/1816
See application file for complete search history.

(56) References Cited

FOREIGN PATENT DOCUMENTS

| | | | |
|---|---|---|---|
| JP | 2011236849 A | * | 11/2011 |
| JP | 2015124692 A | | 7/2015 |
| JP | 2016014345 A | * | 1/2016 |

* cited by examiner

ENGINE EXHAUST GAS RECIRCULATION SYSTEM

TECHNICAL FIELD

The present disclosure relates to an exhaust gas recirculation system for an engine.

BACKGROUND OF THE DISCLOSURE

In automobile engines, exhaust gas recirculation (EGR) makes a combustion chamber re-inhale part of the exhaust gas for the purpose of reducing $NO_x$ (nitrogen oxide) in the exhaust gas or improving thermal efficiency. For example, JP2015-124692A discloses an EGR system which takes out, as EGR gas, part of the exhaust gas from an exhaust pipe which is located downstream of a catalyst for purifying the exhaust gas. In this system, an EGR cooler which cools the EGR gas is disposed near the catalyst. The exhaust pipe which is located downstream of the catalyst is connected with the EGR cooler via a "short" upstream EGR pipe. The EGR cooler is connected with an "in-head" EGR passage which passes through the inside of a cylinder head via a downstream EGR pipe.

Meanwhile, when exhaust gas which flows into the EGR pipe from an EGR gas outlet of the exhaust pipe becomes high in temperature, the temperature of the EGR pipe itself also becomes high. This temperature of the EGR pipe decreases with distance from the EGR gas outlet of the exhaust pipe since heat dissipates from the pipe. However, when the pipe length is short like the upstream EGR pipe disclosed in JP2015-124692A, the heat dissipation is low between the EGR gas outlet of the exhaust pipe and a connecting part to the EGR cooler. Therefore, a thermal expansion amount of the EGR pipe increases, and the temperature increases accordingly at the connecting part at the tip end of the EGR pipe.

Since the heat deformation of the connecting part at the tip end of the EGR pipe is restrained by the EGR cooler, heat stress is caused in the connecting part according to the temperature change. The heat stress increases as the thermal expansion amount increases. Therefore, when heat cycles by starting and stopping EGR are added, thermal fatigue of the EGR pipe due to the repetition of elastoplastic deformation also increases, and the connecting part becomes easily damaged when an external force is applied. Particularly, when the EGR pipe is connected to the EGR cooler which is a heavy object, since vibration of the EGR cooler (caused by vibration of the engine) is added, the connecting part of the EGR pipe is easily damaged.

SUMMARY OF THE DISCLOSURE

Therefore, the present disclosure copes with the heat damage which an exhaust gas recirculation (EGR) pipe receives from exhaust gas.

In order to solve the problem, in the present disclosure, an EGR pipe extending from an EGR gas outlet provided downstream of a catalyst is directly connected to an in-head EGR passage, without being intervened by an EGR cooler.

According to one aspect of the present disclosure, an exhaust gas recirculation system for a multi-cylinder engine is provided, which includes an exhaust manifold connected to a cylinder head of the engine and configured to collect exhaust gas discharged from each cylinder of the engine, a catalyst connected to a downstream end of the exhaust manifold with respect to an exhaust gas flow and configured to purify the exhaust gas, an EGR gas outlet provided downstream of the catalyst and configured to take out part of the exhaust gas as EGR gas to be recirculated to an intake side of the engine, an in-head EGR passage penetrating the cylinder head and through which the EGR gas passes, and an EGR pipe extending from the EGR gas outlet and configured to lead the EGR gas to the in-head EGR passage. The catalyst is disposed so that the exhaust gas flows inside the catalyst from a first side to a second side in a cylinder lined-up direction of the engine. The EGR gas outlet is located on the second side with respect to the center of the engine in the cylinder lined-up direction. An inlet of the in-head EGR passage is located in the first side with respect to the center of the engine in the cylinder lined-up direction. The EGR pipe extending from the EGR gas outlet is directly connected to the inlet of the in-head EGR passage.

According to this layout of the catalyst, the EGR gas outlet, the inlet of the in-head EGR passage, and the EGR pipe, the length of the EGR pipe extending from the EGR gas outlet to the inlet of the in-head EGR passage can be made longer than a case where the EGR pipe is connected to an EGR cooler. Therefore, even if hot exhaust gas is introduced from the EGR gas outlet into the EGR pipe, a heat release amount in the middle of the EGR pipe reaching to the inlet of the in-head EGR passage becomes larger. Thus, compared to when the pipe length is short, an elongation of the entire pipe becomes smaller, and a great increase in the temperature near the inlet of the in-head EGR passage is also avoided.

For this reason, large heat stress at the connecting part of the EGR pipe to the in-head EGR passage will not be produced, and thermal fatigue of the connecting part is suppressed. In addition, vibration from the EGR cooler will not directly propagate to the connecting part. Therefore, an early-stage damage of the EGR pipe at the connecting part will not be caused, and the durability improves.

The EGR gas outlet may open toward the second side in the cylinder lined-up direction. The EGR pipe may have a bend configured to change a flow direction of the EGR gas so that the EGR gas flowing from the EGR gas outlet to the second side flows to the first side in the cylinder lined-up direction where the inlet of the in-head EGR passage exists.

According to this configuration, the EGR pipe becomes longer by being provided with the bend, and heat release area becomes accordingly larger. Therefore, it is advantageous in avoiding the temperature increase in the EGR pipe near the inlet of the in-head EGR passage.

The EGR pipe may have a larger passage cross-sectional area at the bend than at a downstream part extending continuously from the bend to the inlet of the in-head EGR passage.

Therefore, a flow velocity of EGR gas becomes slower in the bend of the EGR pipe, and thus, heat is easily radiated, which is advantageous in avoiding the temperature increase near the inlet of the in-head EGR passage.

The exhaust gas recirculation system may further include a heat insulator covering the exhaust manifold and the catalyst. The EGR pipe may be disposed inside the heat insulator.

Thus, by disposing the heat insulator, a situation is prevented in which EGR gas that stagnates in the EGR pipe is rapidly cooled by low-temperature open air when the engine operation is stopped. Therefore, even when the EGR pipe is long and there is a lot of stagnated EGR gas, condensing of moisture contained in the EGR gas is suppressed.

According to this configuration, the temperature of the EGR pipe is controlled with the layout of the EGR pipe and the heat insulator so that, during the operation of the engine, damage of the EGR pipe at the connecting part to the in-head EGR passage is prevented, and while the engine is stopped, the generation of condensate water is prevented.

The engine may be an inline four-cylinder four-cycle engine. The exhaust manifold may be a 4-2-1 type provided with a first collecting pipe where independent exhaust pipes leading to two center cylinders in the cylinder lined-up direction of the engine are collected, a second collecting pipe where independent exhaust pipes leading to two end cylinders in the cylinder lined-up direction of the engine are collected, and a third collecting pipe where the first collecting pipe and the second collecting pipe are collected. The engine may be configured with an exhaust order of the four cylinders so that exhaust timings of the two center cylinders do not overlap with each other and exhaust timings of the two end cylinders do not overlap with each other. The catalyst may be connected to the third collecting pipe.

In the 4-2-1 type exhaust manifold, an inversion of exhaust pressure wave occurs at each collected part of the first collecting pipe and the second collecting pipe (merging section of the independent exhaust pipes), and an inversion of exhaust pressure wave also occurs at a collected part of the third collecting pipe. However, since the exhaust timings of the two cylinders to which each of the first collecting pipe and the second collecting pipe is connected do not overlap, exhaust interference does not occur. Although the inversion of exhaust pressure wave at the collected part of the third collecting pipe may lead to exhaust interference, it has only a small influence on the exhaust gas to be discharged from the cylinders. In this manner, by adopting the 4-2-1 type manifold, the exhaust interference is suppressed and exhaust gas becomes more easily discharged from each cylinder, which is advantageous to stabilize and optimize the EGR.

The exhaust gas recirculation system may further include an EGR cooler configured to cool the EGR gas. The EGR cooler may be disposed in the engine on the intake side opposite to an exhaust side where the exhaust manifold is disposed, and the EGR gas that passes through the in-head EGR passage may then be introduced into the EGR cooler.

Therefore, by arranging the cylinder head between the EGR cooler and the EGR pipe, the vibration from the EGR cooler is difficult to propagate to the EGR pipe, which is advantageous in preventing damage of the EGR pipe.

DETAILED DESCRIPTION OF THE DISCLOSURE

Hereinafter, a mode for carrying out the present disclosure is described with reference to the accompanying drawings. The following description of a desirable embodiment is merely illustration essentially, and it is not intended to limit the present disclosure, its application, or its usage.

Basic Configuration of Engine

Figure 1:
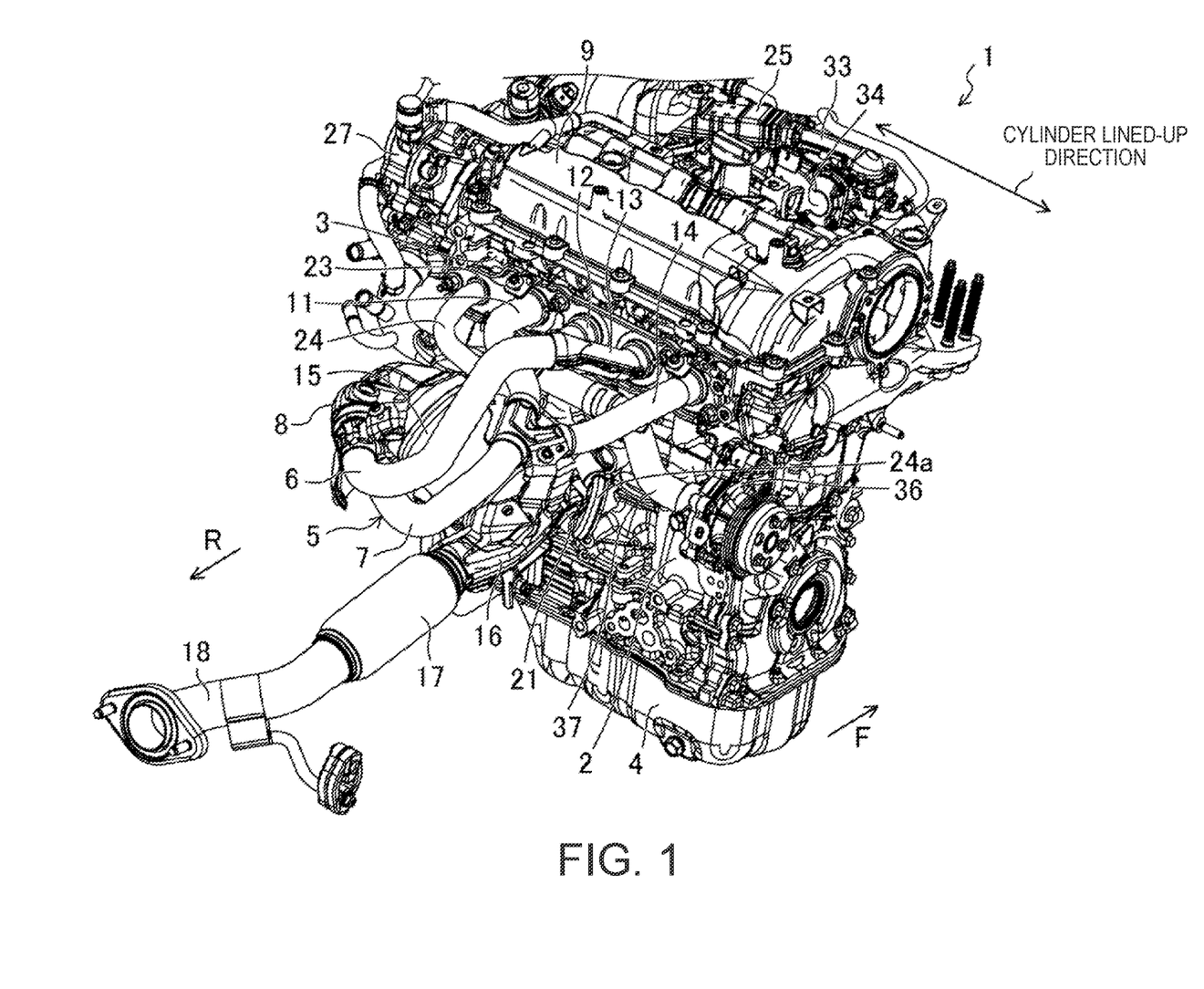
FIG. 1 is a perspective view of an engine when seen from obliquely rearward and upward.

An engine 1 illustrated in FIG. 1 is a multi-cylinder engine which drives a vehicle, and in this example, is an inline four-cylinder four-cycle engine. The engine 1 includes a cylinder block 2, a cylinder head 3 which is coupled to an upper surface of the cylinder block 2, an oil pan 4 coupled to a lower surface of the cylinder block 2, and a cylinder head cover 9 fixed onto the cylinder head 3. The engine 1 is mounted to a front part of the vehicle, which is a so-called "transverse engine" in which the cylinder lined-up direction is oriented in a vehicle width direction. An arrow F of FIG. 1 indicates front or forward of the vehicle, and an arrow R indicates rear or rearward of the vehicle. The same will be applied to other drawings.

An intake manifold is disposed forward of the engine 1, and an exhaust manifold 5 is disposed rearward of the engine 1. Intake air is introduced from the intake manifold into an intake port of each cylinder which opens to a forward side surface of the cylinder head 3. Exhaust gas which is generated inside a combustion chamber of each cylinder is discharged to the exhaust manifold 5 from an exhaust port of each cylinder which opens to a rearward side surface of the cylinder head 3. Thus, the engine 1 is a front-intake rear-exhaust engine in which the front side is an intake side and the rear side is an exhaust side.

In the following description of an exhaust recirculation system, an "upstream end" means an upstream end of an exhaust gas flow or an exhaust gas recirculation (EGR) gas flow, and a "downstream end" means a downstream end of the exhaust gas flow or the EGR gas flow.

Exhaust Manifold

The exhaust manifold 5 is provided with a first collecting pipe 6, a second collecting pipe 7, and a third collecting pipe 8. The first collecting pipe 6 is tubing which collects independent exhaust pipes 12 and 13 which lead to two center cylinders in the cylinder lined-up direction of the engine 1. The second collecting pipe 7 is tubing which collects independent exhaust pipes 11 and 14 which lead to two cylinders at both ends in the cylinder lined-up direction of the engine 1. The third collecting pipe 8 is tubing which collects the first collecting pipe 6 and the second collecting pipe 7. That is, the exhaust manifold 5 is a 4-2-1 type manifold.

As for the engine 1, the exhaust order of the four cylinders is defined so that exhaust timings of the two center cylinders do not overlap with each other and exhaust timings of the two end cylinders do not overlap with each other. In detail, if the cylinder at the left end is called a first cylinder and other cylinders lined up to the right side are called a second cylinder, a third cylinder, and a fourth cylinder, respectively, exhaust gas flows in the order of the first cylinder, the third cylinder, the fourth cylinder, and the second cylinder. Exhaust interference is suppressed by increasing the distance from the exhaust port of each cylinder to the collected location of the first collecting pipe 6 and the second collecting pipe 7 to the third collecting pipe 8.

Figure 2:
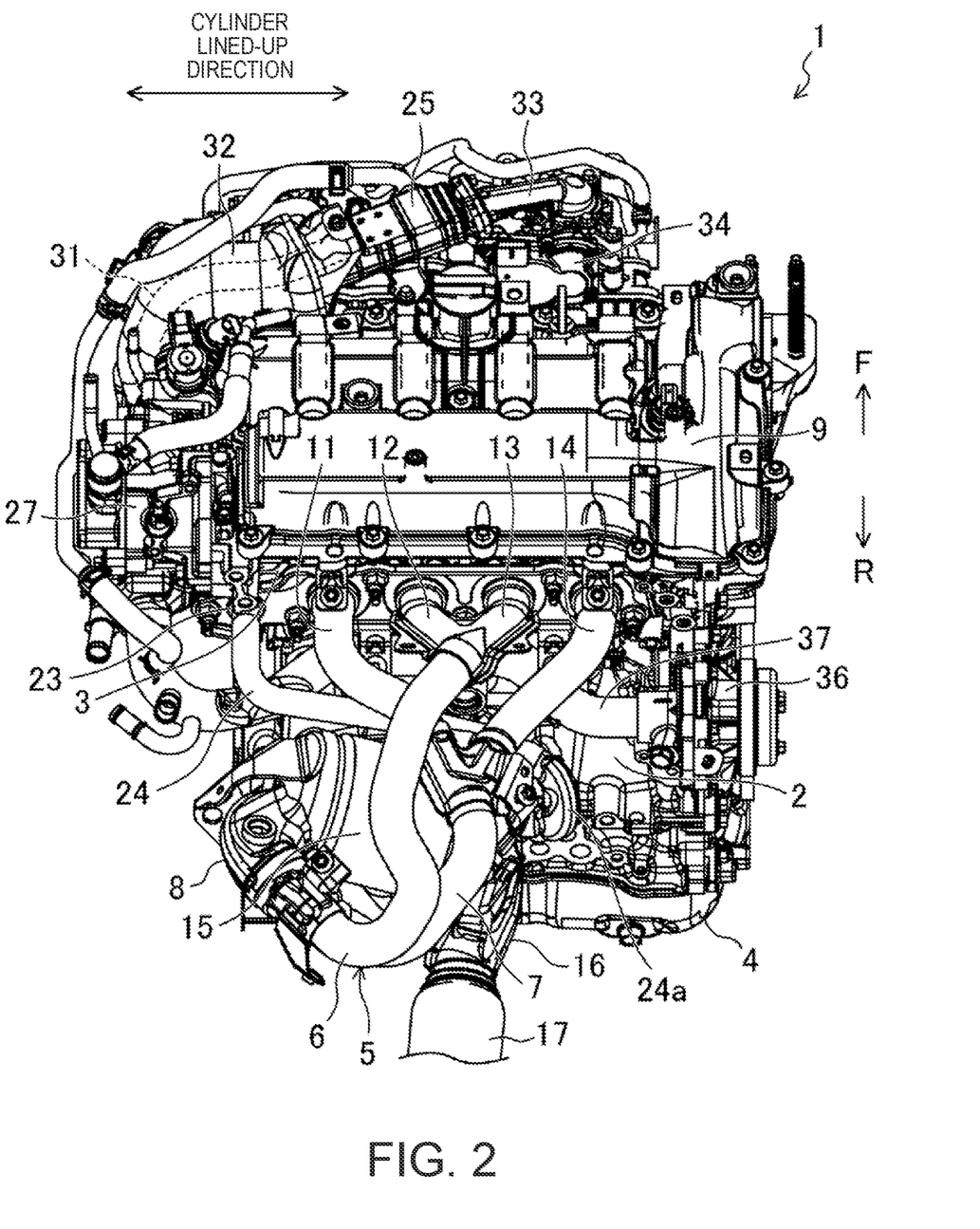
FIG. 2 is a perspective view of the engine from which a heat insulator is removed, when seen from rearward and upward.

As also illustrated in FIG. 2, the independent exhaust pipes 11-14 extend rearwardly from the rearward side surface of the cylinder head 3. The independent exhaust pipes 11 and 14 which lead to the respective two end cylinders are longer than the independent exhaust pipes 12 and 13 which lead to the respective two center cylinders. The end independent exhaust pipes 11 and 14 are collected below the first collecting pipe 6 which collects the center independent exhaust pipes 12 and 13, and continue to the second collecting pipe 7. The first collecting pipe 6 and the second collecting pipe 7 extend rearwardly so that the first pipe 6 is located above the second pipe 7, and are then bent while descending obliquely so that they extend toward one side of the vehicle width direction (the cylinder lined-up direction) and return toward the cylinder block 2, and are then collected and connected to the third collecting pipe 8. The third collecting pipe 8 extends toward the cylinder block 2.

Catalyst

A catalyst 15 which purifies exhaust gas of the engine 1 is connected to a downstream end of the third collecting pipe 8 (i.e., a downstream end of the exhaust manifold 5). The catalyst 15 accommodates in a cylindrical case a honeycomb catalyst in which a honeycomb carrier supports a catalyst component. The catalyst 15 extends, below the first collecting pipe 6 and the second collecting pipe 7, toward the second side in the cylinder lined-up direction along a rearward side surface of the cylinder block 2. In other words, the catalyst 15 is disposed so that the catalyst center axis is oriented in the cylinder lined-up direction or in a direction close to the cylinder lined-up direction so that exhaust gas flows inside the catalyst from a first side to a second side in the cylinder lined-up direction of the engine 1.

The third collecting pipe 8 is connected to an upstream end of the cylindrical case of the catalyst 15, and a downstream end of the case is connected to an exhaust gas outlet pipe 16 extending rearwardly. The exhaust gas outlet pipe 16 is connected to an exhaust pipe 18 extending rearwardly, via a flexible tube 17.

EGR Pipe

An EGR gas outlet 21, which takes out part of the exhaust gas which has passed the catalyst 15 as EGR gas and is recirculated to the intake side of the engine 1, is provided at an upstream end of the exhaust gas outlet pipe 16 connected to the case of the catalyst 15. The EGR gas outlet 21 is located on the second side in the cylinder lined-up direction of the engine 1 with respect to the center in the cylinder lined-up direction (a flowing-out direction of the exhaust gas from the catalyst 15), and opens toward this side.

Figure 3:
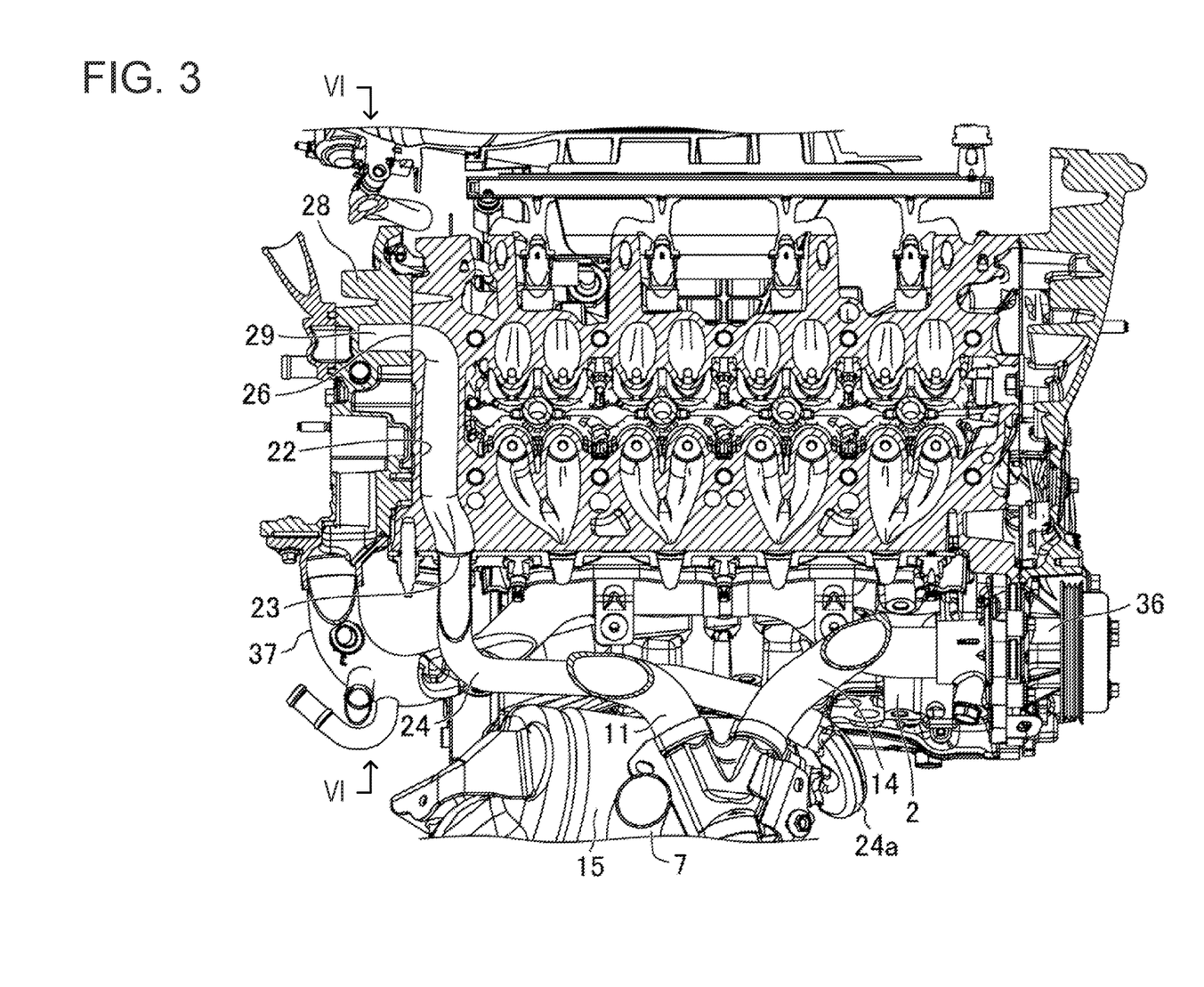
FIG. 3 is a cross-sectional view of the engine which is cut horizontally at a cylinder head part, when seen from above.

As illustrated in FIG. 3, an in-head EGR passage 22 which penetrates the cylinder head 3 is formed in the cylinder head 3 so that the EGR gas passes through the in-head EGR passage 22. The in-head EGR passage 22 is a passage for sending EGR gas from the exhaust side to the intake side of the engine 1, and its inlet 23 opens in an exhaust-side side surface of the cylinder head 3, at an end of the cylinder head 3 on the first side in the cylinder lined-up direction (first cylinder side).

Thus, a first EGR pipe 24 which leads EGR gas from the EGR gas outlet 21 to the in-head EGR passage 22 extends from the EGR gas outlet 21 to the first side in the cylinder lined-up direction, and is directly connected to the inlet 23 of the in-head EGR passage 22. That is, an EGR cooler is not provided to the first EGR pipe 24 which extends from the EGR gas outlet 21 to the inlet 23 of the in-head EGR passage 22. As it will be described later, as illustrated in FIG. 1 etc., an EGR cooler 25 is not disposed on the exhaust side of the engine 1, but is disposed on the intake side of the engine 1.

Figure 4:
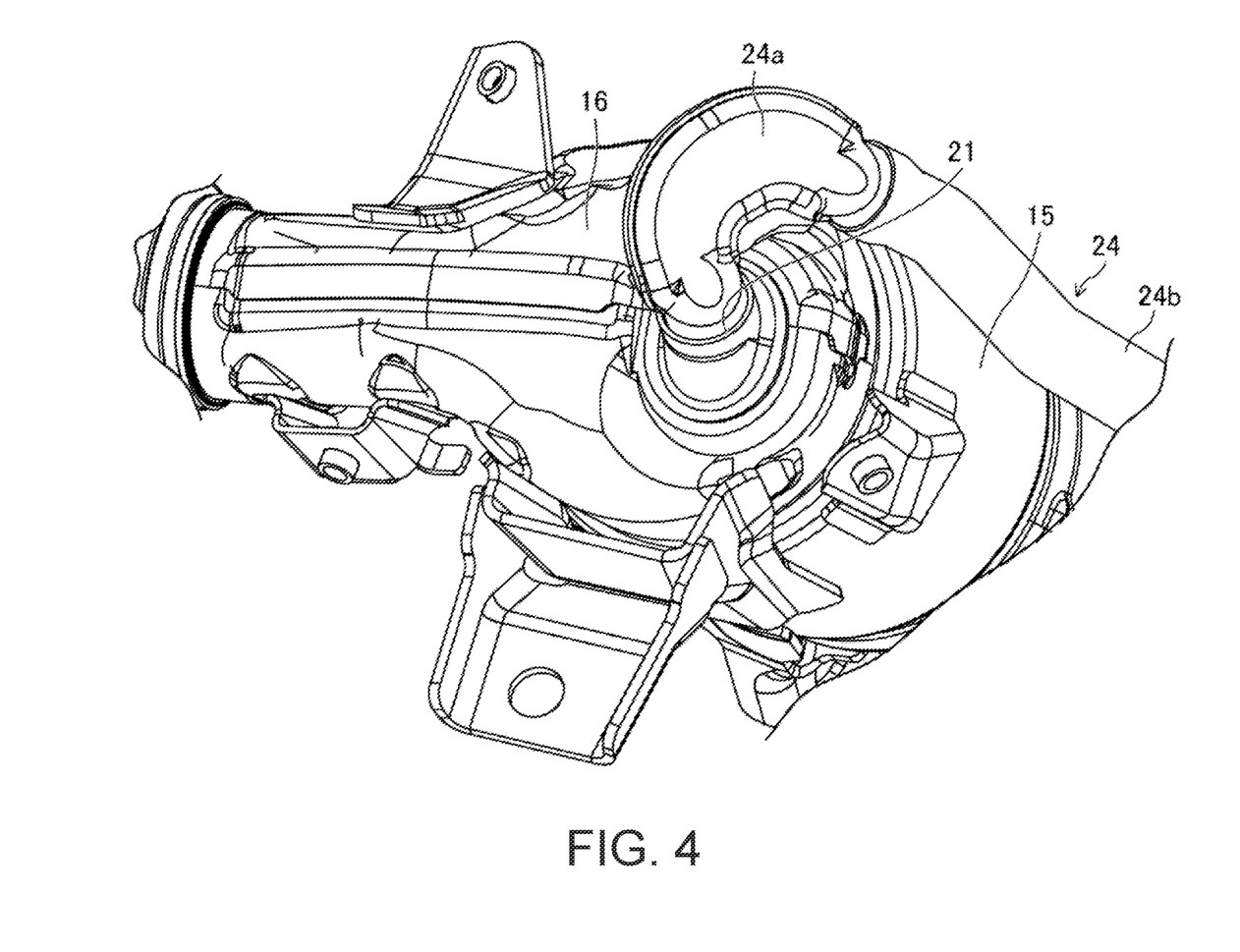
FIG. 4 is a perspective view illustrating an EGR pipe extending from a catalyst.

As described previously, the EGR gas outlet 21 opens toward the second side in the cylinder lined-up direction. Therefore, as illustrated in FIG. 4, the first EGR pipe 24 is provided with a U-shaped bend 24a which changes the flow direction of EGR gas so that the EGR gas which flows out of the EGR gas outlet 21 toward the second side goes to the first side in the cylinder lined-up direction where the inlet 23 of the in-head EGR passage 22 exists.

Describing concretely, the first EGR pipe 24 is comprised of the upstream bend 24a connected at one end to the EGR gas outlet 21, and a downstream part 24b which continues from the other end of the bend 24a and extends to the inlet 23 of the in-head EGR passage 22. The downstream part 24b extends to the first side in the cylinder lined-up direction while passing through below the exhaust manifold 5 between the cylinder head 3 and the catalyst 15, is bent forward at a position corresponding to the one end of the engine 1 in the cylinder lined-up direction, and is connected at a tip end to the inlet 23 of the in-head EGR passage 22.

Figure 5:
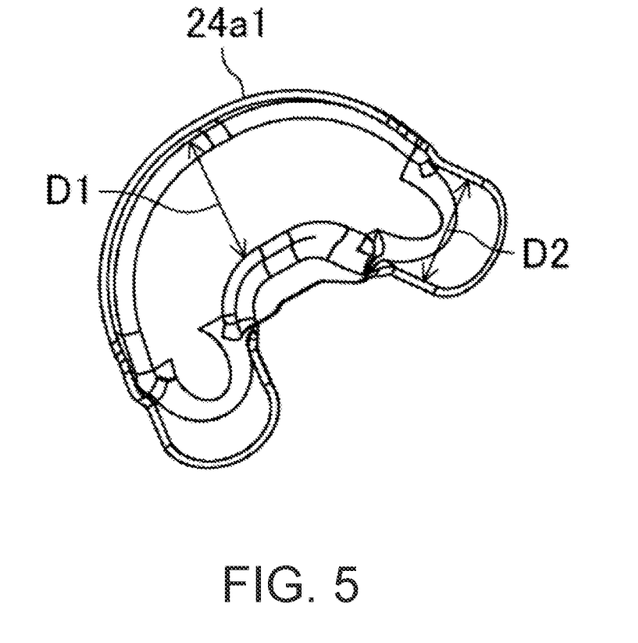
FIG. 5 is a perspective view of a half-split pipe which constitutes a bend part of the EGR pipe.

The bend 24a is formed by uniting a pair of half-split pipes into a complete pipe. As one of the half-split pipe (24a1) of the bend 24a is illustrated in FIG. 5, an inner diameter D1 of the curved part of the bend 24a is larger than an inner diameter D2 of the connecting part to the downstream part 24b. That is, the first EGR pipe 24 has a larger passage cross-sectional area at the curved part of the bend 24a than at the downstream part 24b.

EGR Passage from In-Head EGR Passage to Intake Manifold

As illustrated in FIG. 3, the in-head EGR passage 22 extends from the inlet 23 which opens in the exhaust-side side surface of the cylinder head 3, toward the intake side of the engine 1 at one end in the cylinder lined-up direction of the cylinder head 3. The in-head EGR passage 22 is bent to the first side in the cylinder lined-up direction at a position just before the intake-side side surface of the cylinder head 3, and an outlet 26 opens in one end surface of the cylinder head 3 in the cylinder lined-up direction.

A pump mounting plate 28 which supports a fuel pump 27 to the cylinder head 3 is fixed to the one end surface of the cylinder head 3. An EGR passage 29 where EGR gas flows in from the outlet 26 of the in-head EGR passage 22 is formed in the pump mounting plate 28.

Figure 6:
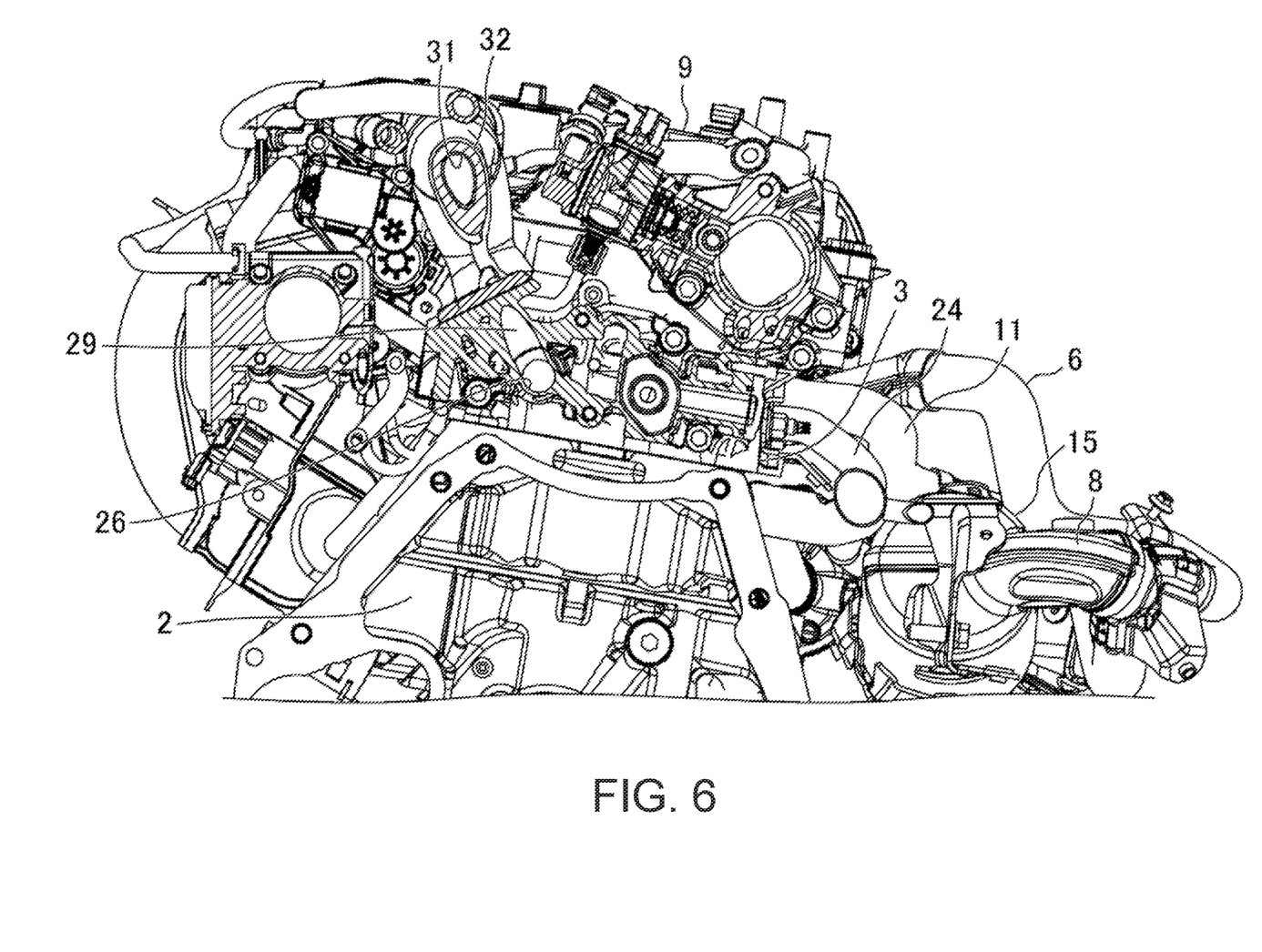
FIG. 6 is a cross-sectional view of the engine taken along a line VI-VI of FIG. 3.

As illustrated in FIG. 6, the EGR passage 29 extends upwardly, and an upstream end of a second EGR pipe 31 is connected to the EGR passage 29. As illustrated in FIG. 2, the second EGR pipe 31 extends to the intake side of the engine 1, and a downstream end thereof is connected at the intake side to an inlet of the EGR cooler 25 of which the longitudinal direction extends in the cylinder lined-up direction (or a direction close to the cylinder lined-up direction). As for the EGR cooler 25, one end in the cylinder lined-up direction becomes an inlet of EGR gas and the other end becomes an outlet. The second EGR pipe 31 is covered with a protector 32.

An upstream end of a third EGR pipe 33 is connected to the outlet of the EGR cooler 25. The downstream end of the third EGR pipe 33 is connected to an EGR valve 34 which adjusts an EGR gas flow rate to a surge tank of the intake manifold.

Heat Insulator

Figure 7:
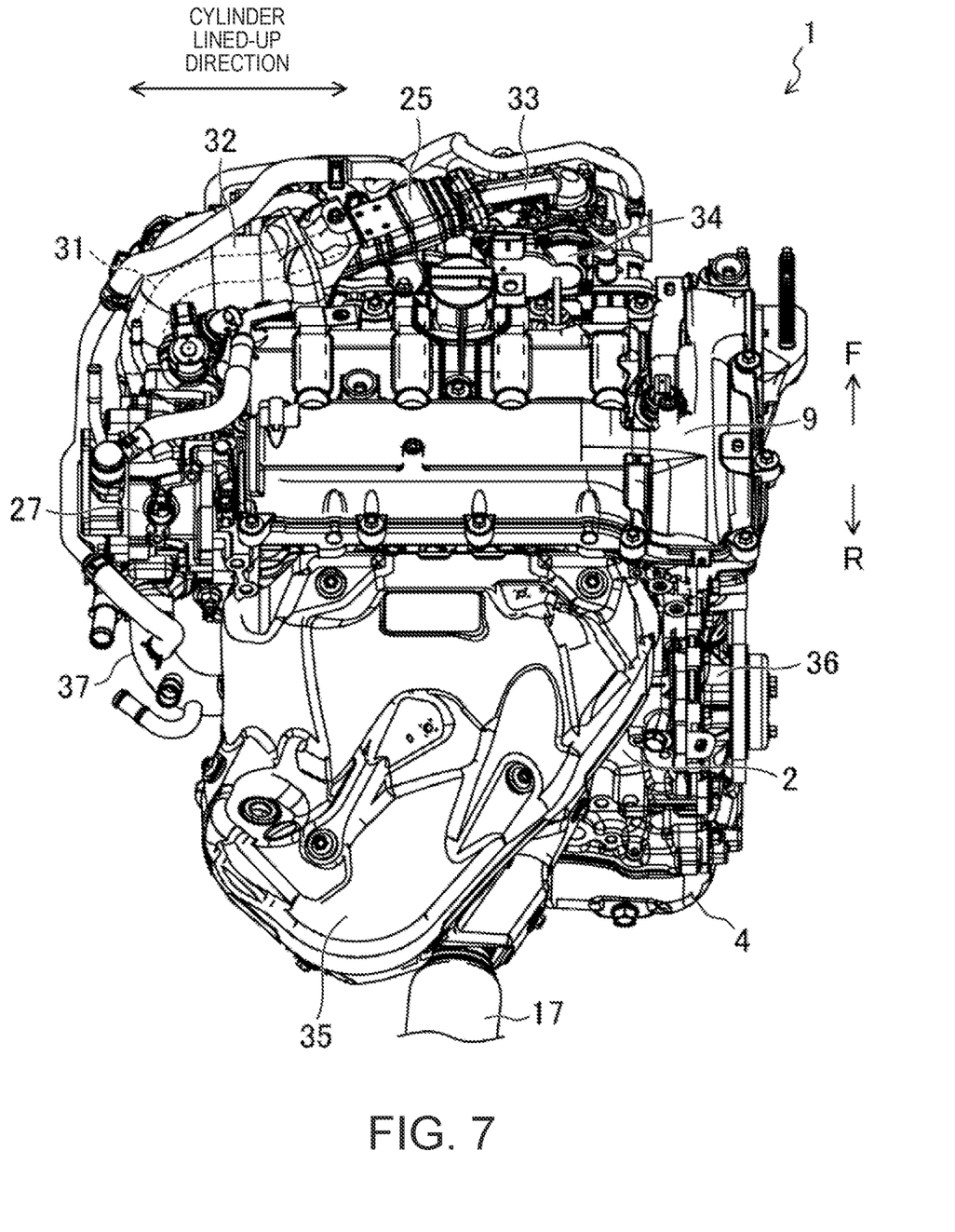
FIG. 7 is a perspective view similar to FIG. 2, furnished with the heat insulator.

As illustrated in FIG. 7, a heat insulator (exhaust insulator) 35 which covers the exhaust manifold 5 and the catalyst 15 is provided on the exhaust side of the engine 1. The heat insulator 35 is formed by uniting an upper insulator which covers the exhaust manifold 5 and the catalyst 15 from above, and a lower insulator which covers them from below. The first EGR pipe 24 is disposed inside the heat insulator 35. As illustrated in FIGS. 1 to 3, a water pump 36 is provided to the other end of the engine 1 in the cylinder lined-up direction. A coolant pipe 37 which sends engine coolant from the water pump 36 to the fuel pump 27 also passes through the inside of the heat insulator 35. The first EGR pipe 24 and the coolant pipe 37 intersect with each other while being close to each other inside the heat insulator 35.

Advantages, Etc. of Exhaust Recirculation System

According to the engine 1, by disposing the catalyst 15 on the exhaust side so that exhaust gas flows from a first side toward a second side in the cylinder lined-up direction, the EGR gas outlet 21 is disposed on the second side with respect to the center of the engine 1 in the cylinder lined-up direction. On the other hand, the inlet 23 of the in-head EGR passage 22 is arranged at one end of the cylinder head 3 in the cylinder lined-up direction. Thus, the first EGR pipe 24 extending from the EGR gas outlet 21 is directly connected to the inlet 23 of the in-head EGR passage 22, without having the intervening EGR cooler 25.

Therefore, the first EGR pipe 24 has a longer pipe length extending from the EGR gas outlet 21 than the case where it is connected to the EGR cooler 25, and it becomes further longer by being provided with the bend 24a. Therefore, even if hot exhaust gas is introduced from the EGR gas outlet 21 into the first EGR pipe 24, a heat release amount in the middle of the first EGR pipe 24 reaching to the inlet 23 of the in-head EGR passage 22 becomes larger. In addition, in this embodiment, since a flow velocity of EGR gas becomes slower in the bend 24a where the passage cross-sectional area is large, heat is easy to be radiated from the first EGR pipe 24.

Therefore, an elongation of the first EGR pipe 24 due to the heat of exhaust gas is suppressed, and a great increase in the temperature near the inlet 23 of the in-head EGR passage 22 is also avoided. For this reason, large heat stress at the connecting part of the first EGR pipe 24 to the in-head EGR passage 22 will not be produced, and thermal fatigue of the connecting part is suppressed. In addition, since the cylinder head 3 intervenes between the first EGR pipe 24 and the EGR cooler 25, vibration of the EGR cooler 25 will not directly propagate to the connecting part of the first EGR pipe 24. Therefore, an early-stage damage of the first EGR pipe 24 at the connecting part will not be caused, and the durability improves.

According to this embodiment, by covering the exhaust manifold 5 and the catalyst 15 with the heat insulator 35, it is advantageous to promptly raise the temperature of the catalyst 15 to activate the catalyst 15 at a cold start of the engine 1 and to prevent a fall of the catalyst temperature (catalytic activity) in a cold climate. Thus, by disposing the first EGR pipe 24 inside the heat insulator 35, EGR gas which stagnates in the first EGR pipe 24 is prevented from being rapidly cooled by low-temperature open air when the engine 1 is stopped. Therefore, even when the first EGR pipe 24 is long and there is a lot of stagnated EGR gas, moisture contained in the EGR gas condensing is suppressed.

Further, in this embodiment, since the 4-2-1 type exhaust manifold 5 is adopted, exhaust interference is suppressed and exhaust gas becomes more easily discharged from each cylinder. Therefore, it is advantageous to stabilize and optimize the exhaust gas recirculation.

Note that in this embodiment, although the 4-2-1 type exhaust manifold 5 is adopted, the exhaust manifold may be a 4-1 type.

Further, the engine 1 may not only be the four-cylinder engine but may be a six-cylinder engine, or may be a longitudinal engine in which the cylinder lined-up direction is oriented in a vehicle front-and-rear direction.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
2 Cylinder Block
3 Cylinder Head
5 Exhaust Manifold
6 First Collecting Pipe
7 Second Collecting Pipe
8 Third Collecting Pipe
9 Cylinder Head Cover
11-14 Independent Exhaust Pipe
15 Catalyst
16 Exhaust Gas Outlet Pipe
21 EGR Gas Outlet
22 In-head EGR Passage
23 Inlet of In-head EGR Passage
24 First EGR Pipe
24a Bend
24b Downstream Part
25 EGR Cooler
35 Heat Insulator

What is claimed is:
1. An exhaust gas recirculation system for a multi-cylinder engine, comprising:
   an exhaust manifold connected to a cylinder head of the engine and configured to collect exhaust gas discharged from each cylinder of the engine;
   a catalyst connected to a downstream end of the exhaust manifold with respect to an exhaust gas flow and configured to purify the exhaust gas;
   an exhaust gas recirculation (EGR) gas outlet provided downstream of the catalyst and configured to take out part of the exhaust gas as EGR gas to be recirculated to an intake side of the engine;
   an in-head EGR passage penetrating the cylinder head and through which the EGR gas passes; and
   an EGR pipe extending from the EGR gas outlet and configured to lead the EGR gas to the in-head EGR passage,
   wherein the catalyst is disposed so that the exhaust gas flows inside the catalyst from a first side to a second side in a cylinder lined-up direction of the engine,
   wherein the EGR gas outlet is located on the second side with respect to the center of the engine in the cylinder lined-up direction,
   wherein an inlet of the in-head EGR passage is located in the first side with respect to the center of the engine in the cylinder lined-up direction, and wherein the EGR pipe extending from the EGR gas outlet is directly connected to the inlet of the in-head EGR passage.

2. The exhaust gas recirculation system of claim 1, further comprising an EGR cooler configured to cool the EGR gas,
wherein the EGR cooler is disposed in the engine on the intake side opposite to an exhaust side where the exhaust manifold is disposed, and the EGR gas that passes through the in-head EGR passage is then introduced into the EGR cooler.

3. The exhaust gas recirculation system of claim 1, further comprising a heat insulator covering the exhaust manifold and the catalyst,
wherein the EGR pipe is disposed inside the heat insulator.

4. The exhaust gas recirculation system of claim 3, further comprising an EGR cooler configured to cool the EGR gas,
wherein the EGR cooler is disposed in the engine on the intake side opposite to an exhaust side where the exhaust manifold is disposed, and the EGR gas that passes through the in-head EGR passage is then introduced into the EGR cooler.

5. The exhaust gas recirculation system of claim 1,
wherein the engine is an inline four-cylinder four-cycle engine,
wherein the exhaust manifold is a 4-2-1 type provided with a first collecting pipe where independent exhaust pipes leading to two center cylinders in the cylinder lined-up direction of the engine are collected, a second collecting pipe where independent exhaust pipes leading to two end cylinders in the cylinder lined-up direction of the engine are collected, and a third collecting pipe where the first collecting pipe and the second collecting pipe are collected,
wherein the engine is configured with an exhaust order of the four cylinders so that exhaust timings of the two center cylinders do not overlap with each other and exhaust timings of the two end cylinders do not overlap with each other, and
wherein the catalyst is connected to the third collecting pipe.

6. The exhaust gas recirculation system of claim 5, further comprising an EGR cooler configured to cool the EGR gas,
wherein the EGR cooler is disposed in the engine on the intake side opposite to an exhaust side where the exhaust manifold is disposed, and the EGR gas that passes through the in-head EGR passage is then introduced into the EGR cooler.

7. The exhaust gas recirculation system of claim 1,
wherein the EGR gas outlet opens toward the second side in the cylinder lined-up direction, and
wherein the EGR pipe has a bend configured to change a flow direction of the EGR gas so that the EGR gas flowing from the EGR gas outlet to the second side flows to the first side in the cylinder lined-up direction where the inlet of the in-head EGR passage exists.

8. The exhaust gas recirculation system of claim 7, further comprising a heat insulator covering the exhaust manifold and the catalyst,
wherein the EGR pipe is disposed inside the heat insulator.

9. The exhaust gas recirculation system of claim 8, further comprising an EGR cooler configured to cool the EGR gas,
wherein the EGR cooler is disposed in the engine on the intake side opposite to an exhaust side where the exhaust manifold is disposed, and the EGR gas that passes through the in-head EGR passage is then introduced into the EGR cooler.

10. The exhaust gas recirculation system of claim 7,
wherein the engine is an inline four-cylinder four-cycle engine,
wherein the exhaust manifold is a 4-2-1 type provided with a first collecting pipe where independent exhaust pipes leading to two center cylinders in the cylinder lined-up direction of the engine are collected, a second collecting pipe where independent exhaust pipes leading to two end cylinders in the cylinder lined-up direction of the engine are collected, and a third collecting pipe where the first collecting pipe and the second collecting pipe are collected,
wherein the engine is configured with an exhaust order of the four cylinders so that exhaust timings of the two center cylinders do not overlap with each other and exhaust timings of the two end cylinders do not overlap with each other, and
wherein the catalyst is connected to the third collecting pipe.

11. The exhaust gas recirculation system of claim 10, further comprising an EGR cooler configured to cool the EGR gas,
wherein the EGR cooler is disposed in the engine on the intake side opposite to an exhaust side where the exhaust manifold is disposed, and the EGR gas that passes through the in-head EGR passage is then introduced into the EGR cooler.

12. The exhaust gas recirculation system of claim 7, wherein the EGR pipe has a larger passage cross-sectional area at the bend than at a downstream part extending continuously from the bend to the inlet of the in-head EGR passage.

13. The exhaust gas recirculation system of claim 12, further comprising a heat insulator covering the exhaust manifold and the catalyst,
wherein the EGR pipe is disposed inside the heat insulator.

14. The exhaust gas recirculation system of claim 12, further comprising an EGR cooler configured to cool the EGR gas,
wherein the EGR cooler is disposed in the engine on the intake side opposite to an exhaust side where the exhaust manifold is disposed, and the EGR gas that passes through the in-head EGR passage is then introduced into the EGR cooler.

15. The exhaust gas recirculation system of claim 12,
wherein the engine is an inline four-cylinder four-cycle engine,
wherein the exhaust manifold is a 4-2-1 type provided with a first collecting pipe where independent exhaust pipes leading to two center cylinders in the cylinder lined-up direction of the engine are collected, a second collecting pipe where independent exhaust pipes leading to two end cylinders in the cylinder lined-up direction of the engine are collected, and a third collecting pipe where the first collecting pipe and the second collecting pipe are collected,
wherein the engine is configured with an exhaust order of the four cylinders so that exhaust timings of the two center cylinders do not overlap with each other and exhaust timings of the two end cylinders do not overlap with each other, and
wherein the catalyst is connected to the third collecting pipe.

16. The exhaust gas recirculation system of claim 15, further comprising an EGR cooler configured to cool the EGR gas,     wherein the EGR cooler is disposed in the engine on the intake side opposite to an exhaust side where the exhaust manifold is disposed, and the EGR gas that passes through the in-head EGR passage is then introduced into the EGR cooler.

* * * * *